US006740850B2

(12) United States Patent
Mattis

(10) Patent No.: US 6,740,850 B2
(45) Date of Patent: May 25, 2004

(54) ELECTRIC CIGAR LIGHTER ASSEMBLY

(75) Inventor: Donald Mattis, Norwalk, CT (US)

(73) Assignee: Casco Products Corporation, Bridgeport, CT (US)

( * ) Notice: Subject to any disclaimer, the term of this patent is extended or adjusted under 35 U.S.C. 154(b) by 217 days.

(21) Appl. No.: 10/140,588

(22) Filed: May 7, 2002

(65) Prior Publication Data

US 2003/0209531 A1 Nov. 13, 2003

(51) Int. Cl.[7] .................................................. F23Q 7/22
(52) U.S. Cl. ........................................................ 219/265
(58) Field of Search ................................ 219/265, 266, 219/264, 263; 361/264, 265, 266; 123/145 A

(56) References Cited

U.S. PATENT DOCUMENTS

| 2,220,978 A | * | 11/1940 | Shakespeare et al. ........ 219/265 |
| 2,262,483 A | * | 11/1941 | Ashton ........................ 219/264 |
| 2,292,918 A | * | 8/1942 | Ashton ........................ 219/265 |
| 2,498,116 A | * | 2/1950 | Sinko .......................... 219/264 |
| 3,863,047 A | * | 1/1975 | Mase .......................... 219/265 |
| 3,975,619 A |   | 8/1976 | Uda |
| 4,156,126 A | * | 5/1979 | Siiberg ....................... 219/270 |
| 4,168,422 A |   | 9/1979 | Horwitt et al. |
| 4,177,374 A |   | 12/1979 | Horwitt et al. |
| 4,204,109 A |   | 5/1980 | Horwitt et al. |
| 4,207,455 A |   | 6/1980 | Horwitt et al. |
| 4,230,931 A |   | 10/1980 | Horwitt et al. |
| 4,456,817 A | * | 6/1984 | Mehnert et al. ............. 219/263 |
| 5,233,162 A |   | 8/1993 | Von Gaisberg et al. |
| 5,493,098 A | * | 2/1996 | Diederich .................... 219/265 |
| 5,900,172 A |   | 5/1999 | Thivet |
| 5,928,538 A | * | 7/1999 | Thivet ......................... 219/264 |
| 5,932,126 A |   | 8/1999 | Thivet |
| 5,942,141 A | * | 8/1999 | Neyret ........................ 219/270 |
| 5,998,763 A |   | 12/1999 | Mattis et al. |
| 6,476,359 B2 | * | 11/2002 | Rostan ........................ 219/265 |
| 6,538,236 B1 | * | 3/2003 | Rostan ........................ 219/267 |

* cited by examiner

Primary Examiner—Edward K. Look
Assistant Examiner—Vinod D. Patel
(74) Attorney, Agent, or Firm—Mitchell D. Bittman; Louis C. Dujmich

(57) ABSTRACT

A cigar lighter comprising heating unit and socket in which heating unit is slidably received; heating unit having housing and further comprising switch having a first switch contact connected to a second end of a heating element, the switch further having second switch contact electrically connected to second electrical power contact, and heating unit further comprising a bimetal element for opening the switch when the electrical heating element reaches predetermined temperature; the socket comprising housing having base at distal end thereof, the base being provided with contact cup comprising a plurality of axially projecting fingers each biased radially inwardly for electrically contacting said annular contact element of heating unit when heating unit is inserted in socket, and further comprising an insulating connector assembly at the distal end of socket housing comprising at least one electrical terminal for connection to source of electrical power, electrical terminal being connected to contact cup.

41 Claims, 11 Drawing Sheets

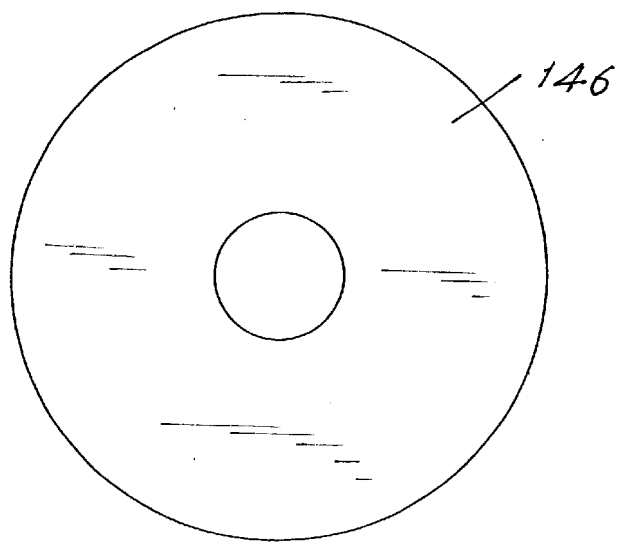
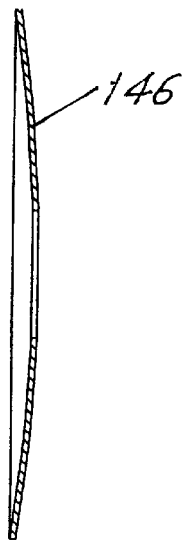
FIG. 9    FIG. 9A
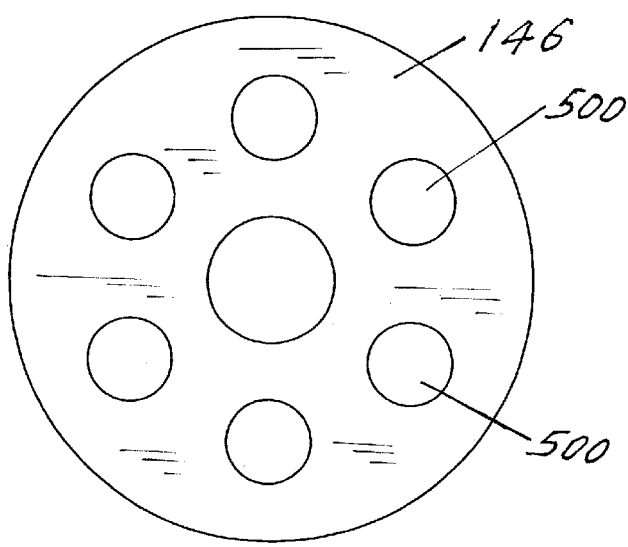
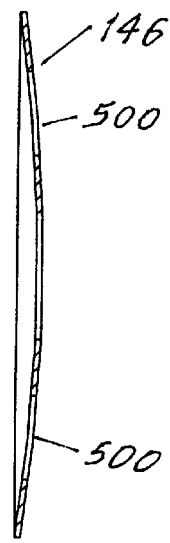
FIG. 10    FIG. 10A

ELECTRIC CIGAR LIGHTER ASSEMBLY

BACKGROUND OF THE INVENTION

The present invention relates to electric cigar and cigarette lighters, and in particular, to such lighters for automotive applications.

Various lighters for automotive applications are known including lighters shown in the following U.S. Pat. Nos. 4,168,422, 4,204,109, 4,207,455, 4,177,374, 5,998,763, and 4,230,931.

U.S. Pat. No. 4,168,422 is exemplary of lighters of the type incorporating a switching element in the lighter unit itself. A typical electric lighter comprises a lighter unit which is removably received in an electrical socket. In the prior art device of U.S. Pat. No. 4,168,422, the lighter unit, which is insertable into and removable from the lighter socket, includes a contact switch which is activated by pushing on the lighter knob. When the switch is activated, electric power flows to the lighter heating element. When the heating element of the lighter unit reaches a sufficient temperature to ignite a cigar or cigarette (ignition temperature), a bimetallic element heated by the heating element snaps from a first, nonheated position to a second position, operating the switch to disconnect the heating element from the source of power. At the same time, once the bimetallic element activates. the lighter unit knob pops a small distance out of its housing to notify the user that the heating element is sufficiently hot to provide an ignition temperature.

The prior art device suffers from a number of deficiencies. One deficiency is that when the lighter unit is disposed in the socket, a substantially flat contact engages with a flat contact member provided in the lighter socket. Contact is maintained between the flat contact member and the flat contact of the lighter unit via the force exerted by a compression spring. Because the contact surfaces merely abut each other, there is a problem that contact may be lost, causing arcing and inoperability of the lighter.

Another problem with the prior art device is that the frictional engagement of the pop out portion of the lighter unit may be excessive and may not allow the lighter heating element to be electrically disconnected sufficiently quickly. Rapid disconnection of the lighter heating element will become an important issue in the future as automakers convert to higher voltage electrical systems. In particular, the automotive manufacturers are now planning to convert to so-called 42 volt (36 volt battery) electrical systems to satisfy the increased electrical power demands of automobiles of the future which will incorporate many more electronic and electrical functions heretofore previously performed by mechanical or hydraulic systems. It is important to provide for quick disconnection of the lighter heating element in such higher voltage electrical systems because the increased voltages will cause the heating elements to reach operating temperatures more quickly and if rapid disconnection is not made, failure of the heating element will result.

Another deficiency of the prior art lighters is that the only indication that the lighter is being heated is provided by the position of the knob of the lighter unit in the socket. When the lighter is being heated by electrical current, the knob is pushed in. When the heating element has reached operating temperature, the knob pops out. However, there is no other indication and it is not immediately obvious when looking at a lighter unit in its socket whether it is energized or de-energized by electrical current. It accordingly would be useful to have an additional indication that the lighter unit is being supplied with electrical current.

SUMMARY OF THE INVENTION

It is an object of the present invention to provide a cigar lighter assembly which ensures good electrical contact with the source of electrical power to energize the heater element. It is yet still a further object of the present invention to provide a lighter assembly which enables rapid disconnection of the heating element when the heating element has reached ignition temperature.

It is yet still a further object of the present invention to provide a lighter assembly which provides a visible indication that the heating element is being energized by electrical current other than the popped-in/popped-out position of the lighter knob.

It is yet still a further object of the present invention to provide a lighter unit which is capable of operating on the higher voltages planned for automotive electrical systems of the future without failure of the lighter heating element.

The above and other objects of the present invention are achieved a cigar lighter assembly comprising: a heating unit and a socket in which the heating unit is slidably received, the heating unit comprising first and second electrical power contacts and having a heating unit housing, the housing having an electrical heating element therein, the electrical heating element having a first end electrically connected to the first electrical power contact, the first electrical power contact comprising an annular contact element disposed at a distal end of said heating unit, the heating unit further comprising a switch, the switch having a first switch contact electrically connected to a second end of said heating element, the switch further having a second switch contact electrically connected to the second electrical power contact, and the heating unit further comprising a bimetal element for opening the switch when the electrical heating element reaches a predetermined temperature, the socket comprising a socket housing, the socket housing being sized so as to slidably and frictionally receive the heating unit housing therein, the socket housing having a base at a distal end thereof, the base being provided with a contact cup comprising a plurality of axially projecting fingers each biased radially inwardly for electrically contacting said annular contact element of said heating unit when said heating unit is inserted in said socket, and further comprising an insulating connector assembly at the distal end of said socket housing comprising at least one electrical terminal for connection to a source of electrical power, said electrical terminal being electrically connected to said contact cup.

The objects of the invention are also achieved by a cigar lighter heating unit comprising a heating unit housing, first and second electrical power contacts, the housing having an electrical heating element therein, the electrical heating element having a first end electrically connected to the first electrical power contact, the first electrical power contact comprising an annular contact element disposed at a distal end of said heating unit, for slidable contact with an electrical power source terminal, the heating unit further comprising a switch, the switch having a first switch contact electrically connected to a second end of said heating element, the switch further having a second switch contact electrically connected to the second electrical power contact, and the heating unit further comprising a bimetal element for opening the switch when the electrical heating element reaches a predetermined temperature.

According to a preferred embodiment, the heating unit further comprises an illumination device for visibly indicating that the heating element is being powered by electrical current.

The objects of the invention are also achieved by an electrical socket for a cigar lighter heating unit comprising a socket housing, the socket housing being sized so as to slidably and frictionally receive a housing of the heating unit therein, the socket housing having a base at a distal end thereof, the base being provided with a contact cup comprising a plurality of axially projecting fingers each biased radially inwardly for electrically slidably contacting an annular contact element of said heating unit when said heating unit is inserted in said socket, and further comprising an insulating connector assembly at the distal end of said socket housing comprising at least one electrical terminal for connection to a source of electrical power, said electrical terminal being electrically connected to said contact cup.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIG. 4A is a sectional view taken along lines A—A of FIG. 4 of the heating element assembly;

FIG. 4B is a front view of the heating element assembly;

FIG. 9 is a plan view of one embodiment of a bimetal disc utilized for deactivating electrical energization of the heating element;

FIG. 9A is a cross-sectional view of the bimetal disc of FIG. 9;

FIG. 10 is an alternative bimetal disc; and

FIG. 10A is a cross-sectional view of the alternative bimetal disc of FIG. 10.

DETAILED DESCRIPTION OF EMBODIMENTS OF THE INVENTION

Figure 1:
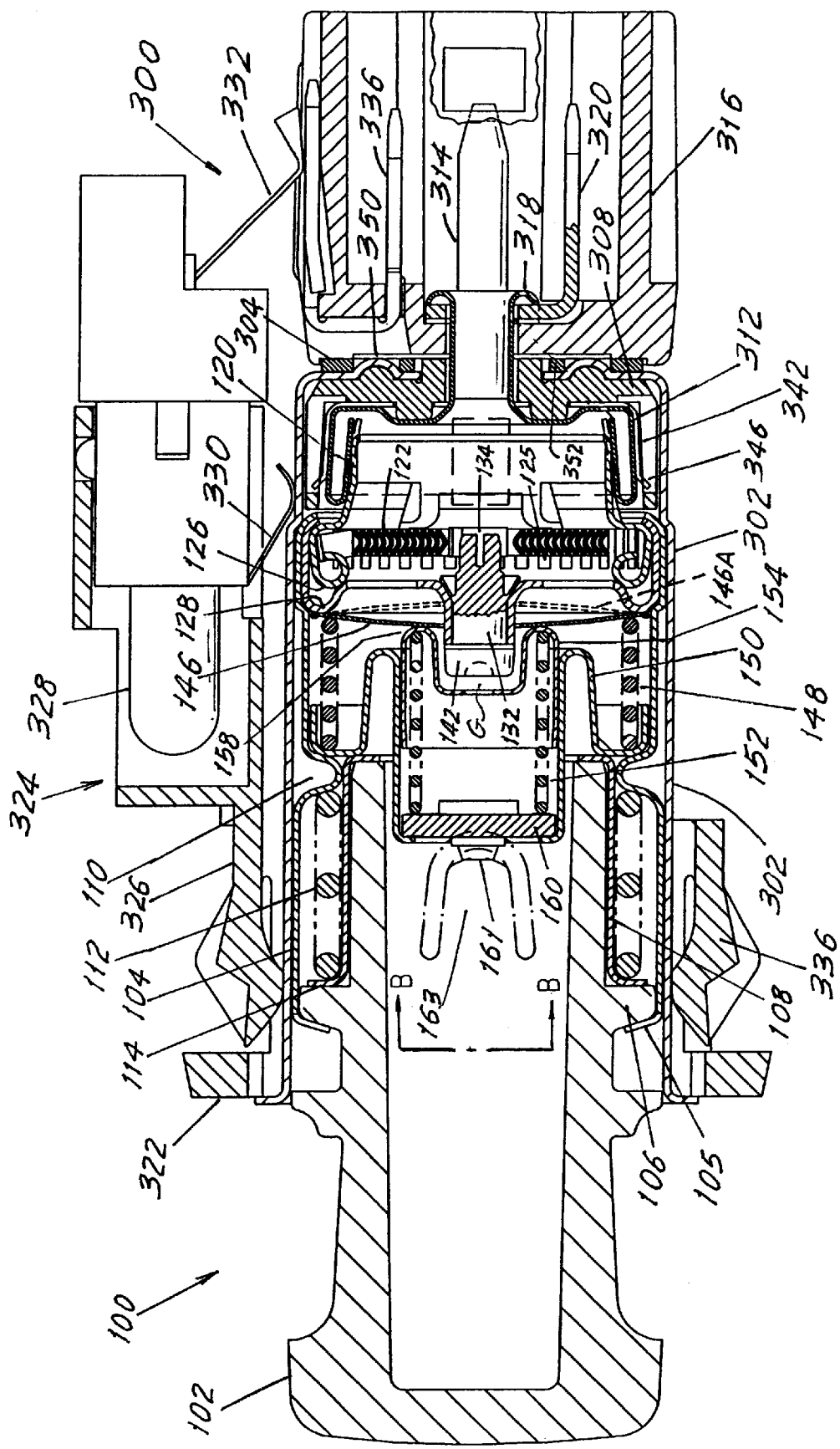
FIG. 1 shows a cutaway view of the lighter assembly including the lighter heating unit assembly and the lighter socket, with the lighter heating unit assembly in the electrically disengaged position.
Figure 1B:
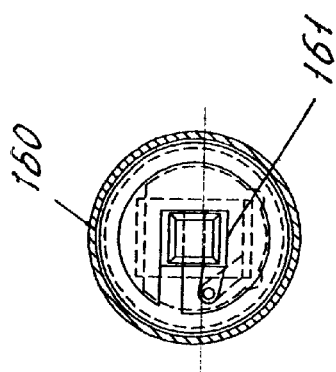
FIG. 1B shows the indicator printed circuit board viewed along lines B—B of FIG. 1.
Figure 1A:
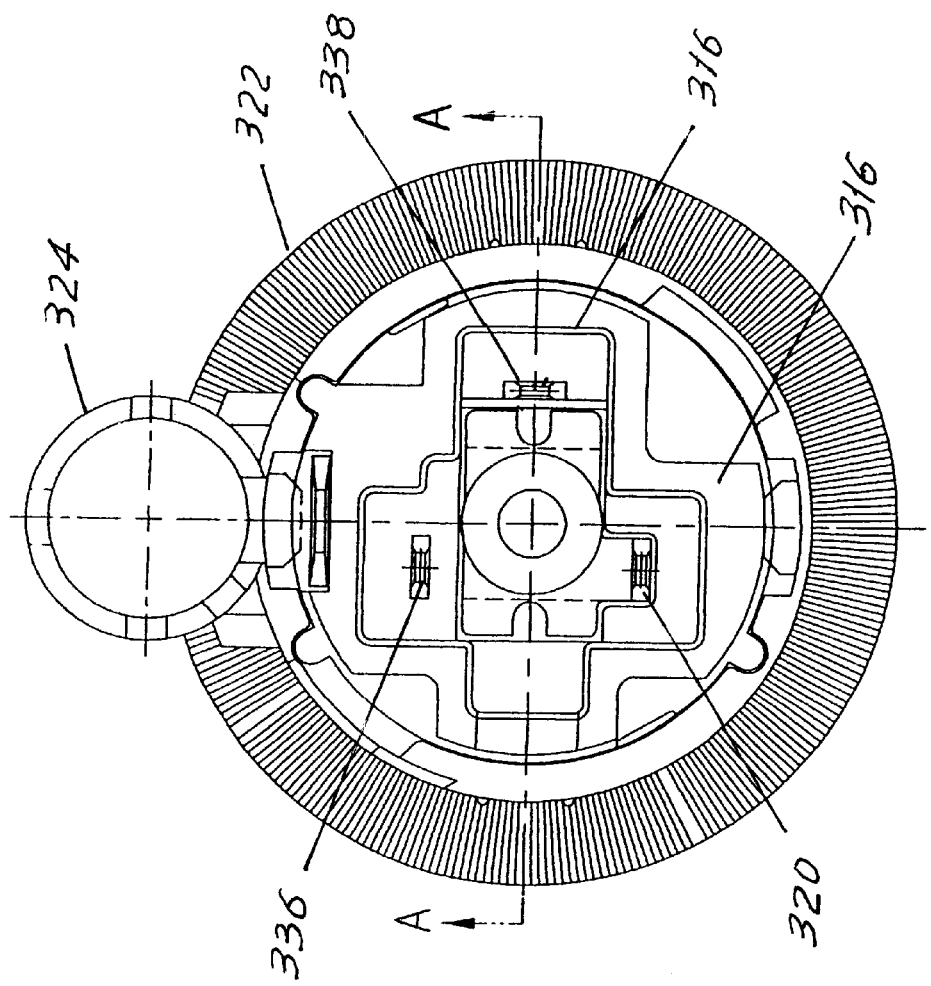
FIG. 1A is a rear view of the lighter assembly showing a plan view of the socket.
Figure 1C:
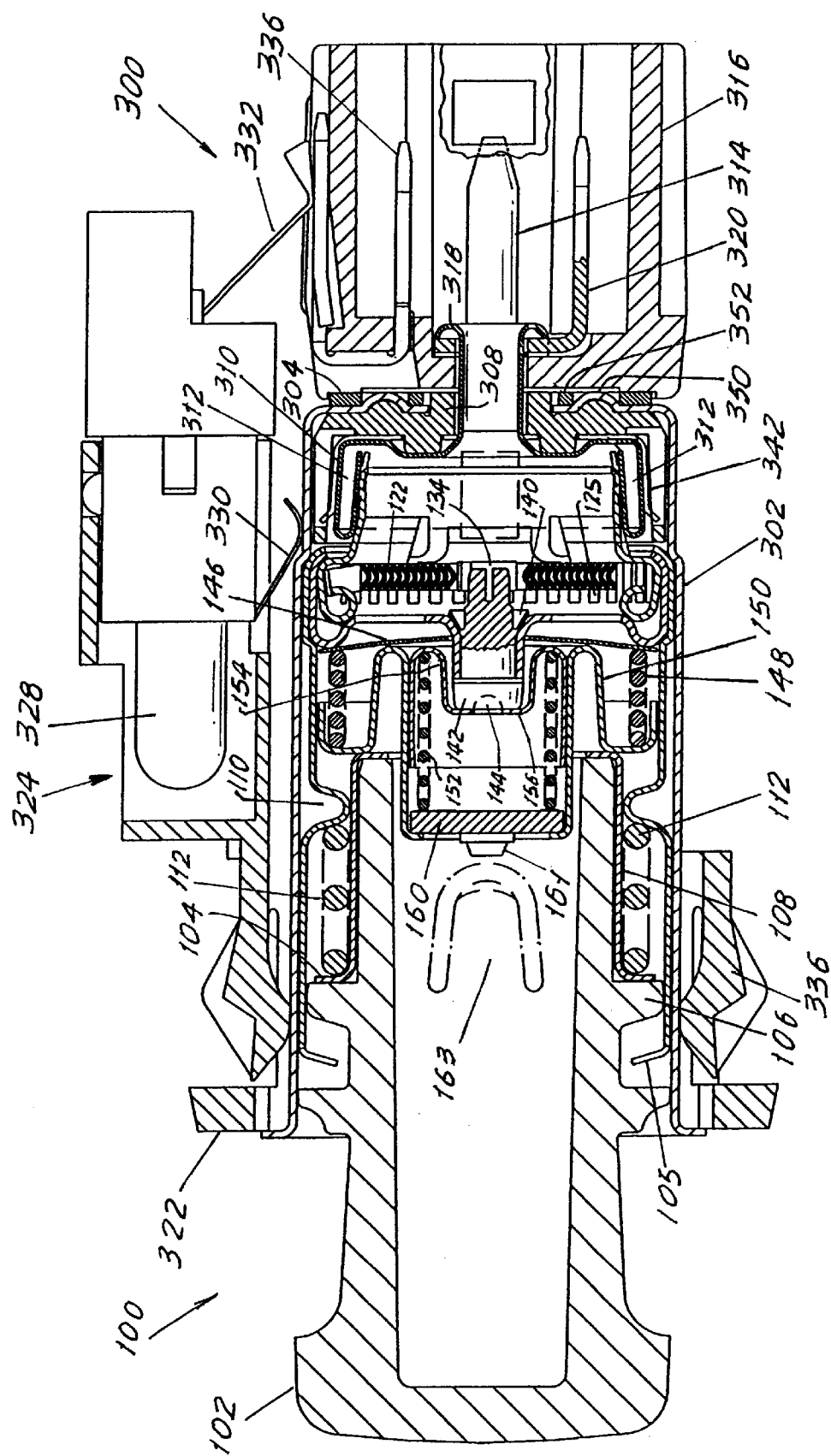
FIG. 1C shows the same view as FIG. 1, but showing the lighter heating unit assembly in the electrically engaged position.

With reference now to the drawings, the lighter assembly of the present invention comprises two elements shown in their assembled state in FIGS. 1 and 1C. The two elements generally comprise an insertable heating unit assembly 100, shown separately in FIG. 2, and the socket assembly 300 into which the heating unit assembly 100 is inserted, shown separately in FIG. 3. The heating unit assembly is received slidably in the socket assembly 300 and both are shown in the assembled state in FIG. 1. In this figure, the heating unit assembly 100 is shown in its storage state, i.e., in its state when the heating element is electrically disconnected from the source of electrical power. In FIG. 1C, the heating element of the heating unit assembly is electrically connected to the power source.

The heating unit assembly 100 generally comprises a knob 102 made of a suitable material, preferably an insulating material, although not necessarily an insulating material. Preferably it is made of a material that transmits light energy or has a portion thereof that transmits light energy as will be explained below.

Figure 4:
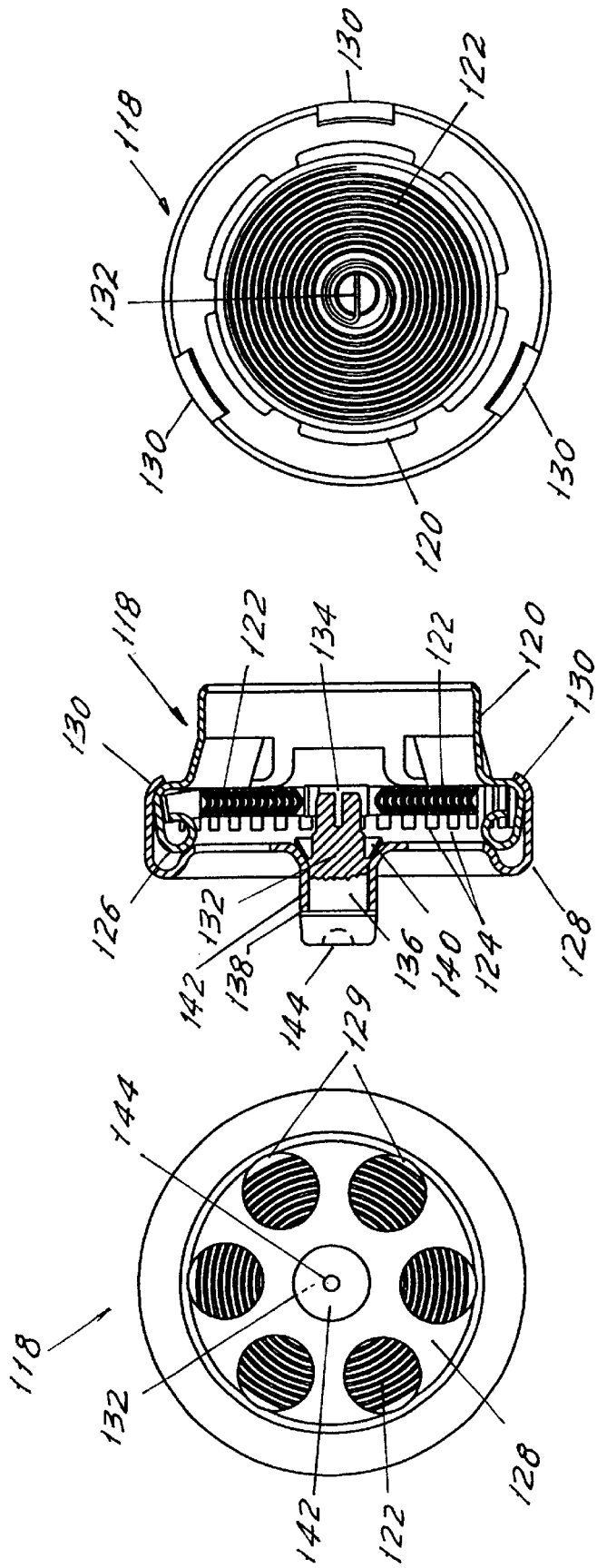
FIG. 4 is a plan view of the heating element assembly of the lighter heating unit assembly.
Figure 7A:
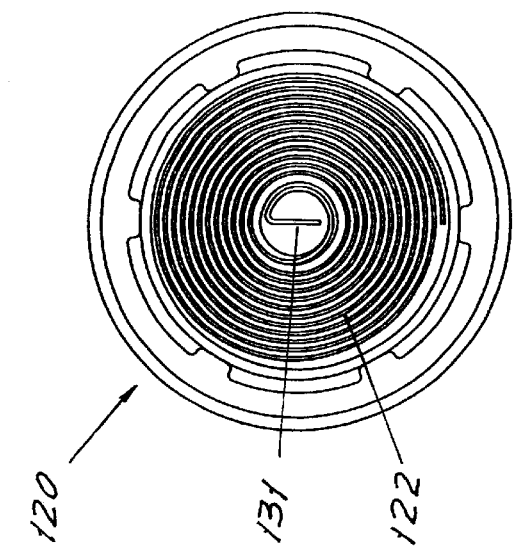
FIG. 7A is a rear view of the coil retainer assembly of FIG. 7.
Figure 7:
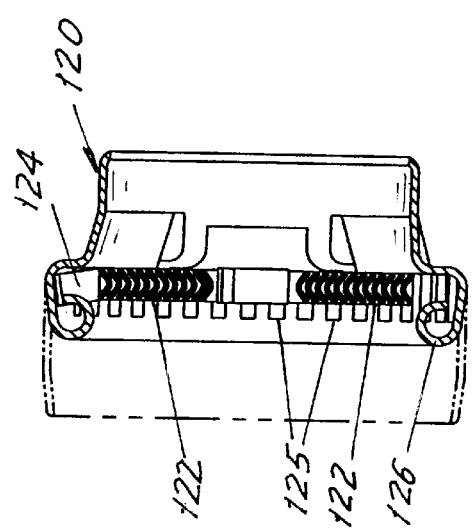
FIG. 7 is a cross-sectional view of the heating coil retainer assembly.
Figure 7B:
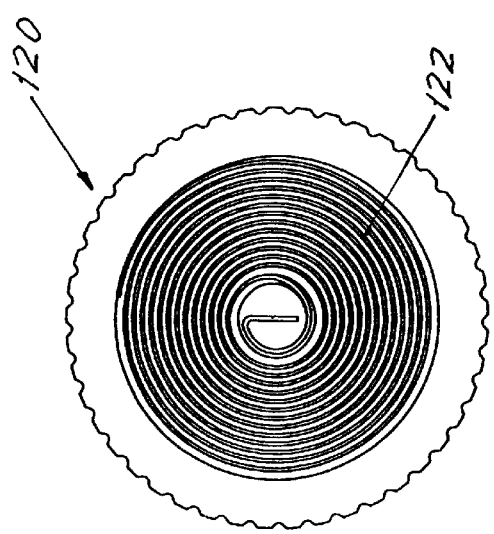
FIG. 7B is a front view of the coil retainer assembly of FIG. 7.
Figure 8A:
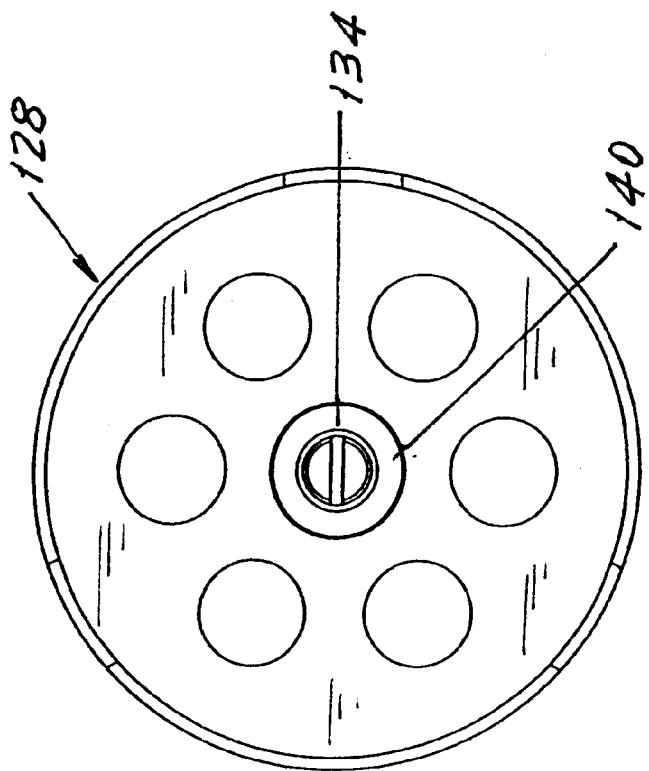
FIG. 8A is a front view of the insulating portion of FIG. 8.
Figure 8:
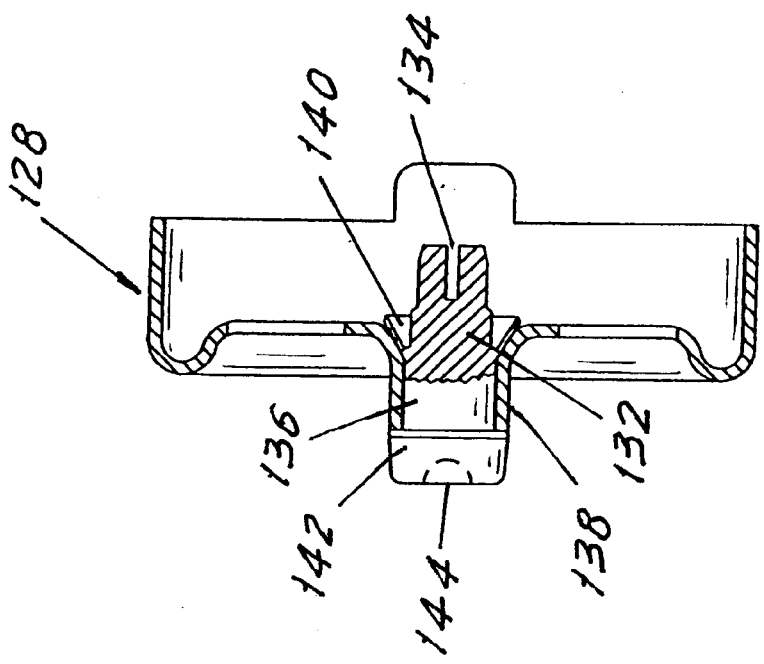
FIG. 8 is a sectional view of the insulating portion of the coil retainer assembly together with a contact rivet forming a portion of the switch for disconnecting the heating element when it has been heated sufficiently.

The knob 102 is coupled to an ash guard 104 by bending a plurality of ash guard lugs 105 around an annular projection 106 preferably molded into the knob 102. A cylindrical spring retainer 108 is provided fixedly attached to the knob 102. The ash guard 104 includes an annular depression 110 formed therein which serves to cage a compression spring 112 in position between the annular depression 110 and an annular lip 114 of the spring retainer 108. Ash guard 104 is crimped at 116 to a heating element assembly 118. With reference to FIG. 4A, heating element assembly 118 includes an inner coil retainer assembly 120 shown in FIG. 7 which is electrically connected to one end of heating coil 122 at 124 as shown in FIG. 7. A rim 126 of the inner coil retainer 120 is crimped over internally on itself, as shown in FIG. 7. The inner coil retainer assembly 120 includes a plurality of side apertures 125 therein to provide heat dissipation. Coil 122 is thus held in position by inner coil retainer 120. Inner coil retainer 120 has a distal-most end which serves as the hot electrical contact engaging the hot contact of the socket. Disposed about inner coil retainer 120 is an insulating outer coil retainer 128. Preferably, outer coil retainer 128 is made from aluminum suitably anodized so that it is insulating. Outer coil retainer 128 It is crimped about the inner coil retainer 120 at 130, thus forming the heating element assembly 118. The innermost end 131 of the heating coil 122 (FIG. 7A) is coupled electrically to a contact rivet 132 which has a split end 134 for receiving the innermost end 131 of the heating coil 122. The contact rivet 132 is provided within an opening 136 in the outer heating coil retainer 128, and the rivet 132 locates the outer heating coil retainer 128 between a shoulder 138 formed at one end of the contact rivet 132 and a second shoulder 140 formed by a riveting, pressing or peering operation. Shoulder 138 forms a contact surface 142, preferably formed with a hemispherical recess 144, which, as well known, reduces arcing at the contact surface. Disposed in engagement with the insulating outer heating coil retainer 128 is a bimetal disc 146 (FIGS. 1, 2) whose operation will be explained. The phantom lines 146A show the location of the bimetal disc 146 after the user activates the lighter by pressing knob 102 into the socket. FIG. 1C shows the bimetal disc 146 after the lighter has been activated and the heating coil 122 is energized with electrical current and is heating up.

Holding the bimetal disc 146 in position is a compression spring 148 maintained in position by a spring retainer 150. Spring retainer 150 also acts to maintain a compression spring 152 positioned between an inner portion of the spring retainer 150 and a contact cup 154 which has a contact surface 156 provided for contacting contact surface 142 of the contact rivet 132. The contact cup 154 forms an annular surface 158 which is in engagement with the bimetal disc 146. Disposed between the spring retainer 150 and spring 152 is a printed circuit board 160 which may include a light emitting diode 161 and any necessary current limiting resistive element. A lens, reflective element or light guiding element may be provided to suitably direct light forward to front surface of knob 102, which is preferably translucent or transparent or provided with an optical insert or surface to allow light to be guided therethrough. The purpose of the light emitting diode 161 is to provide a visible indication that the heating coil is being energized by electrical current. FIG. 1B shows a view of the printed circuit board taken along the lines B—B of FIG. 1.

Figure 2:
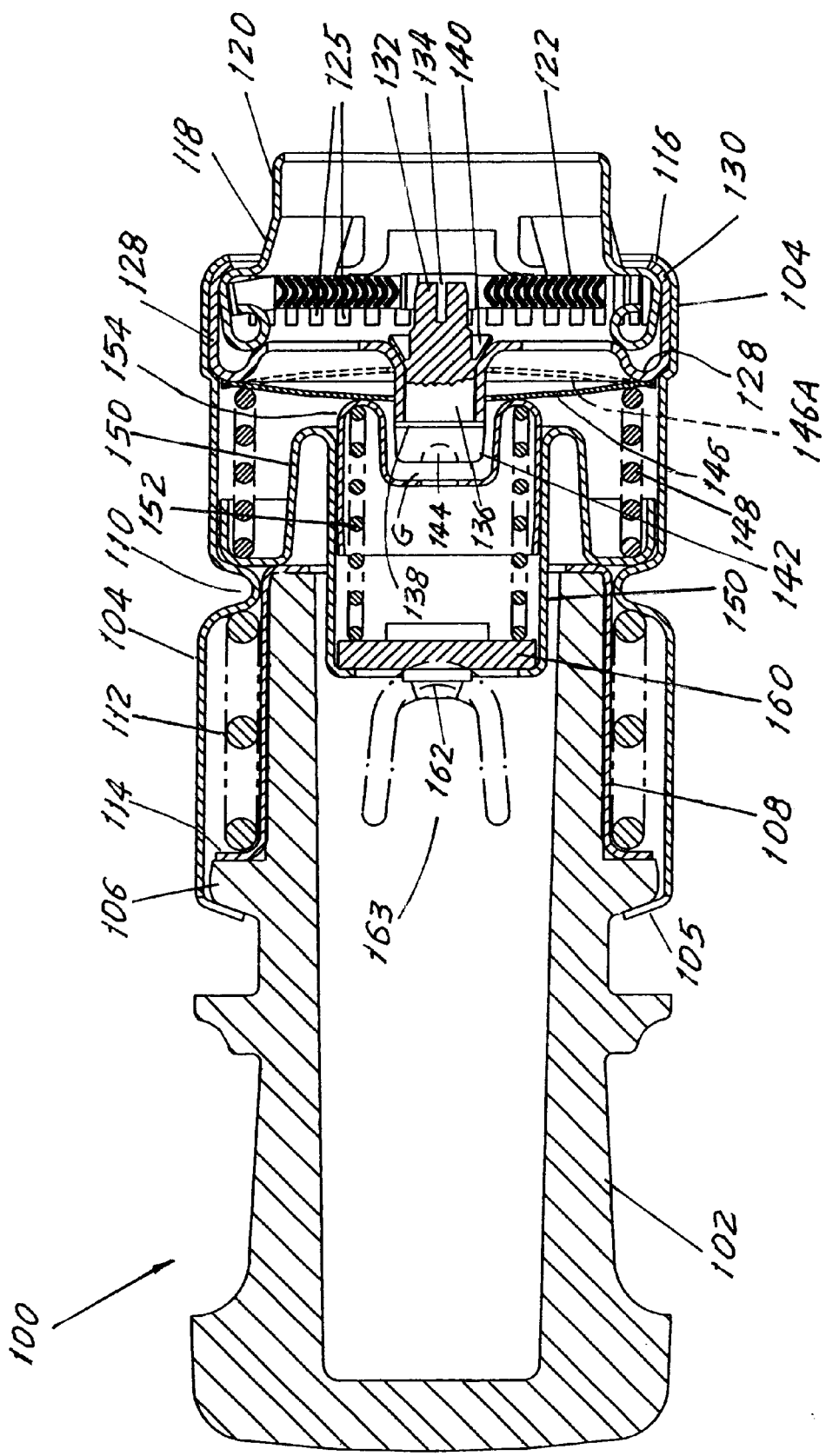
FIG. 2 shows the lighter heating unit assembly in cross-sectional view.
Figures 3, 3A:
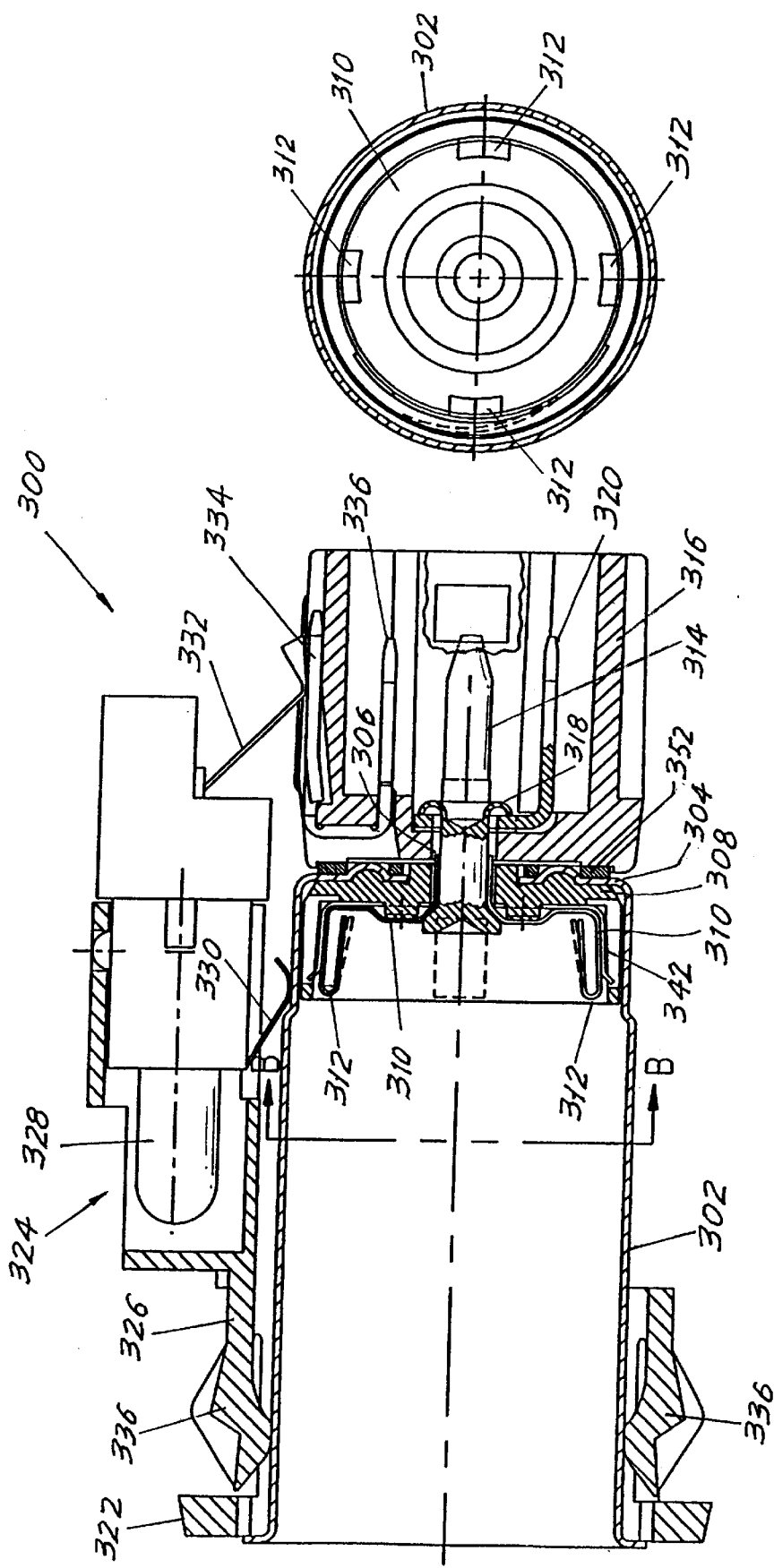
FIG. 3 shows the lighter socket.
FIG. 3A is a sectional view taken along lines B—B of FIG. 3.

FIG. 3 shows the electrical socket 300 for the heating unit assembly of FIG. 2. The electrical socket 300 comprises a well 302. The well 302 has a base portion 304 with a central opening 306. Situated at the base 304 of the well 302 is an electrical insulator 308. Mounted on the electrical insulator 308 is a contact cup 310. The contact cup 310 has a plurality of electrically conducting fingers 312 (FIG. 3A) which are adapted to provide electrical current to the heating unit assembly 100 by contacting the inner coil retainer 120, as will be described later. Fingers 312 bend over on themselves as shown and have a spring action as shown by the phantom lines so that they bias radially inwardly due to the spring action.

Figure 5:
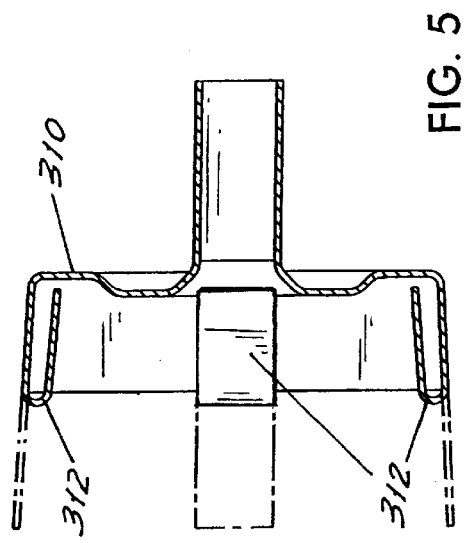
FIG. 5 is a cross-sectional view of the contact cup of the lighter socket.
Figure 6:
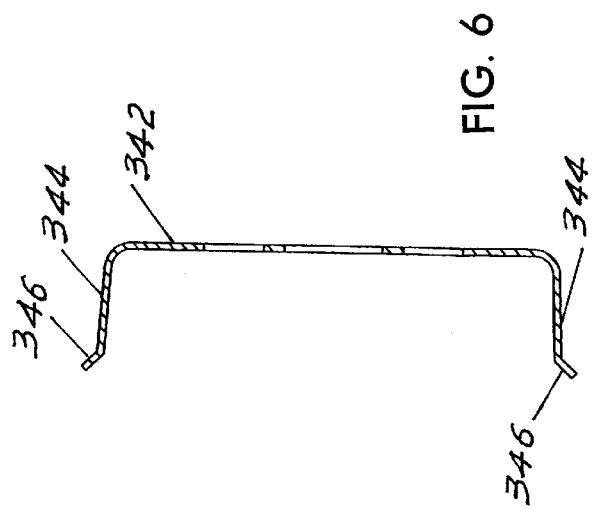
FIG. 6 is a sectional view of the thermal breaker of the socket.
Figure 5A:
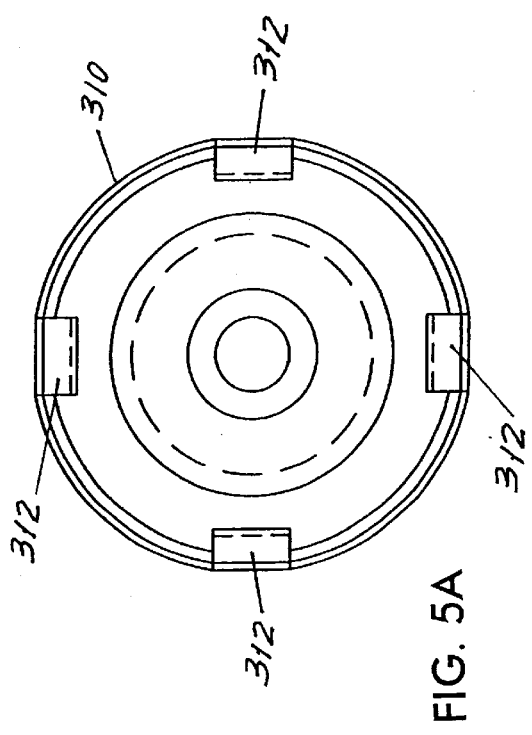
FIG. 5A is a front view of the contact cup of the lighter socket of FIG. 5.
Figure 6A:
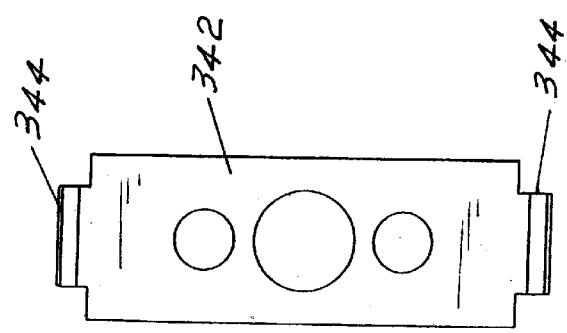
FIG. 6A is a front view of the thermal breaker.
Figure 6C:
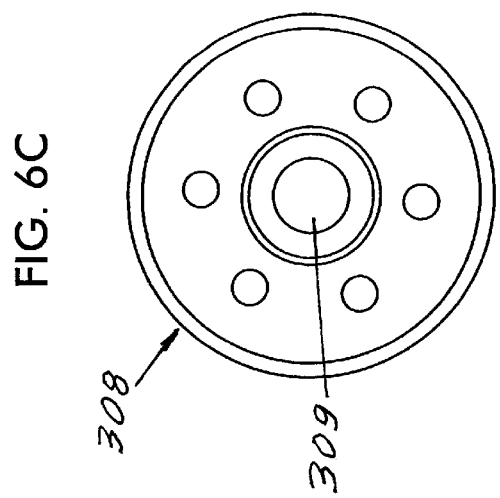
FIG. 6C is a rear view of the socket insulator.
Figure 6B:
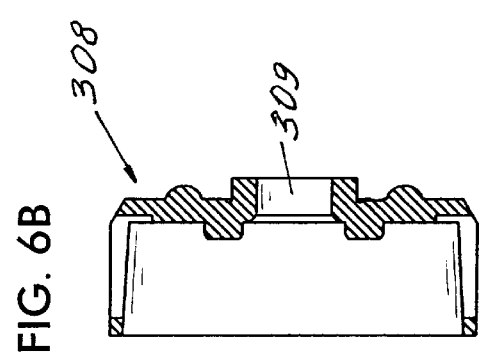
FIG. 6B is a sectional view of the socket insulator.
Figure 6F:
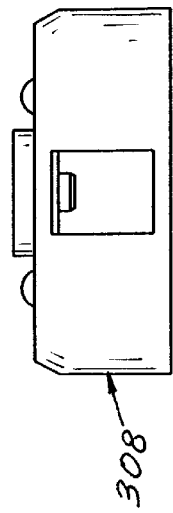
FIG. 6F is a side view of the socket insulator.
Figure 6D:
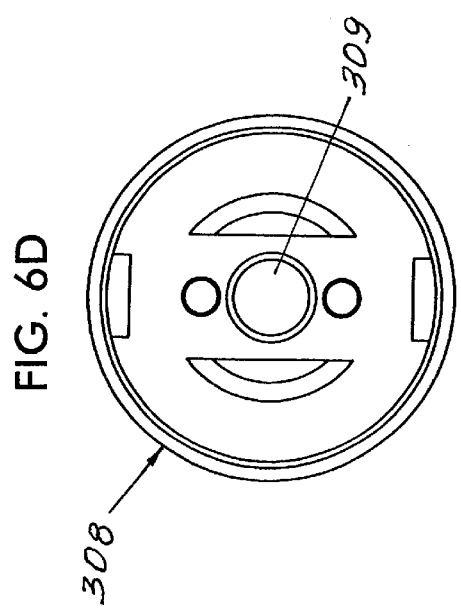
FIG. 6D is a front view of the socket insulator.
Figure 6E:
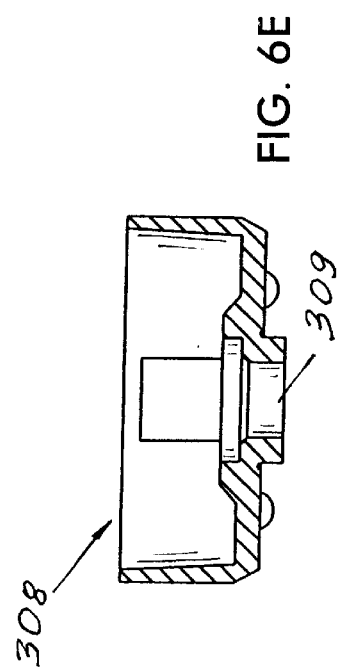
FIG. 6E is a sectional view taken along lines A—A of FIG. 6D.

At the center of insulator 308 and in electrical contact with the contact cup 310 is a contact stud 314. The contact stud 314 extends through the central opening 306 in base portion 304, an aligned central opening 309 (FIG. 6B) in insulator 308 and an insulating connector assembly housing 316. The contact cup 310, as shown more clearly in FIGS. 1 and 5, also extends through the opening in the insulator 308 and the opening in the connector assembly housing 316 and the contact stud 314 is riveted, pressed or crimped over at 318 to hold the connector assembly housing 316 to the well 302 and hold insulator 308, contact cup 310 and insulating housing 316 in place. The crimping is shown at 318 in FIG. 1. Contact stud 314 is also in engagement with a terminal 320 that is also held underneath the riveted, crimped or pressed portion 318 of the contact cup 310. Accordingly, the contact stud 314, contact cup 310 and electrical terminal 320 are in electrical connection. A wire from the automotive electrical system is connected to the terminal 320 to provide one side of the electrical power to the lighter, what is commonly referred to as the "hot" side.

Also slidably mounted on the well 302 is an illuminating ring 322 which is optically illuminated by a light source 324 which is mounted to the well 302 through an electrically insulating structure 326. The structure 326 is adapted to convey light from the light source 328 therethrough, and thus illuminate the light ring 322 so that the location of the lighting unit is visible in darkness to the occupants of the vehicle. The light source 324 receives electrical power through a grounding spring contact 330 and through a hot spring contact 332 which engages with a U-shaped electrical connector 334 which has a terminal end 336 for the provision of electrical power for lighting the lamp. The plastic structure 326 includes integral snap fingers 336 for securing the socket 300 in an opening in an automotive application.

As shown in FIG. 1A, the connector assembly housing 316 has a rearward facing end having a configuration adapted to receive an electrical plug from the vehicle's wiring harness. The connector housing 316 has provisions for the electrical hot terminal 320, the lamp hot terminal 336 as well as the common electrical ground return terminal 338 for the heating element and lamp.

The socket 300 also includes, in electrical connection with the contact cup 310, as shown in FIGS. 1 and 3, a thermal breaker 342. The thermal breaker 342 is shown in detail in FIGS. 6 and 6A. It comprises a metallic conducting element which has upstanding elements 344 having contact points 346, which are adapted to move radially outwardly in response to overheating. The fingers 344 are normally in the position shown in FIG. 1. In response to overheating, the fingers move through openings 350 in insulator 308 to contact well 302, thereby shorting the hot terminal to ground and blowing or tripping a fuse or circuit breaker supplying power to the lighter unit. Details of the insulator 308 are shown in FIGS. 6B-6F.

The operation of the lighter is as follows. The normal storage position of the heating unit assembly is as shown in FIG. 1. In this position, the bimetal disc 146 will have the orientation shown by the solid lines in FIG. 1. Further, the contact surface 142 of contact rivet 132 is separated by a gap G from the contact cup 154. Further, contact cup 310 of socket 300, which is electrically connected to the hot terminal 320, as discussed above, engages with the contact portion of the inner coil retainer 120, as shown in FIG. 1. The contact fingers 312, as discussed previously, bias under spring action radially inwardly against the contact cup 120. The distal end of contact cup 120 provides an annular sliding contact surface in engagement with the contact fingers 312 of the socket 300. This provides an improved electrical power contact of the lighter heating unit assembly 100 with the socket 300 contact than is achieved in the prior art, for example, the prior art device of U.S. Pat. No. 4,168,422. Accordingly, the hot supply from the automobile electrical system is in electrical connection from the terminal 320 to the contact stud 314 and contact cup 310 and then to the inner coil retainer 120, through the coil 122 to the contact rivet 132. However, because of the gap G between the contact cup 154 and the contact stud 132, there is no return path to ground and therefore no electrical energization of the heating coil 122.

To use the lighter, the user will press the knob 102, positioned as shown in FIG. 1, axially further into the socket 300. Ashguard 104 functions as a friction sleeve, having spring fingers 163 which bear against the inside of socket 300 to provide a sliding engagement therewith. Application of the axial force will cause force to be transmitted through and compress the take-up compression spring 112 disposed between the annular rim 114 of the spring retainer 108 and the annular depression 110 provided in the ash guard 104. FIG. 1C shows the lighter heating unit assembly 100 after it has been pushed further into socket 300 to activate the lighter. If excessive axial force is provided to knob 102, it will be taken up to a limited extent by the compression spring 112. At the same time, compression spring 148 located between the spring retainer 150 and the bimetal element 146 which firmly rests against the insulating outer coil retainer 128, likewise compresses further. The bimetal disc 146 is always held firmly in position by the spring 148. Further, when the axial force is provided to the knob 102, spring retainer 150 moves axially inwardly, and the inner compression spring 152 applies a force to the contact cup 154. Contact cup 154 moves rearwardly and contact surface 156 makes electrical contact with contact surface 142 of contact rivet 132. At the same time, the contact cup 154 exerts a force on the bimetal disc 146, causing it to assume the position shown in FIG. 1C and also shown in the phantom lines 146A in FIGS. 1 and 2.

Now that the contact cup 154 is in electrical contact with contact surface 142, a return path to ground is now provided for the heating element 122. This return path is from the contact surface 142 of contact rivet 132 to the contact surface 156 of the contact cup 154 and then to the spring retainer 150 by the sliding engagement of the contact cup 154 with the spring retainer 150. Further, the spring 152 can also conduct electrical current and may be provided to provide an electrical ground for the printed circuit board 160. Return current flows from the spring retainer 150 then to the ash guard 104, and then to the socket well 302, as shown in FIG. 1. The socket well 302 is in electrical contact with the ground return line 338 via metal dimples 350 (see FIG. 1) and a metal plate 352 which engages with terminal 338. Accordingly, a current path through the heating element 122 from the hot terminal to ground has now been provided now that gap G has been closed and the heating element 122 rapidly heats up to ignition temperature.

Bimetal disc 146 is now heated up through openings 129 in outer coil retainer 128, as shown in FIG. 4B. Bimetal disc 146 moves forwardly as it heats up and snaps into the position shown in FIG. 1 by the solid lines once the heating element has reached ignition temperature. This causes the contact cup 154 to move in the spring retainer 150 against the action of compression spring 152 separating the contact surface 142 of contact rivet 132 from the contact surface 156 of contact cup 154, thus breaking the electrical circuit and providing an audible indication to the vehicle occupant that the ignition temperature has been reached. Additionally, the force exerted on compression spring 152 causes spring retainer 150 to move forwardly, exerting force on annular depression 110 of ash guard 104, causing the knob 102 to pop forwardly to the position shown in FIG. 1. Compressed springs 112 and 148 assist in providing a rapid movement. The user can then remove the heating unit assembly 100 from the socket 300 to light the cigarette.

The invention provides printed circuit board 160 which has an LED 161 provided thereon as well as any necessary current limiting resistor. Printed circuit board 160 receives electrical power from the hot terminal 320 through any suitable electrical connection, not shown, and is grounded by virtue of its connection to spring retainer 150. Accordingly, while the heating element 122 is passing an electrical current and heating up, the LED 161 will illuminate through the knob 102, after its light is focused/directed/guided by a lens or light guide. Knob 102 is preferably made of a translucent or transparent material or has an optical insert to indicate that the heating element is in the process of being heated to ignition temperature. Once the bimetal disc 146 pops to the position shown in FIG. 1 and opens the switch comprising contact cup 154 and the contact surface 142, the LED 161 ceases to be illuminated, thus indicating to the vehicle occupant that the heating element has reached ignition temperature.

A benefit of the structure of the present invention is that it provides for rapid opening of the switch comprising contact face 142 of contact stud 132 and contact face 156 of contact cup 154. This allows the lighter assembly of the present invention to be used with voltages higher than 12 volts, i.e., for example, the higher voltages planned for automobiles of the future which have increasingly complicated and more electrical power consuming electrical systems. In the future, automobiles will likely have a 42 volt (36 volt battery) electrical system and as a result, the heating element 122 will be heated up more rapidly by the higher voltage electrical systems. It is thus important to disconnect the heating element rapidly when it has reached ignition temperature. If rapid disconnect is not achieved, the heating element will likely fail by burning out. To facilitate this rapid disconnect, the invention employs a reduced friction surface between well 302 and ash guard 104.

In addition, the invention can also employ the alternative bimetal disc shown in FIG. 10. This bimetal disc has openings 500 therein, suitably selected. These openings serve two purposes: to reduce the mass of the bimetal disc and thus allow it to be heated more rapidly; and to allow the bimetal disc to snap more quickly once heated, thereby assuring a rapid disconnect of the heating element.

In addition, the present invention provides a visible indication that it is in use or correspondingly, that ignition temperature has been reached when the LED 161 ceases to be illuminated. Thus, the present invention provides both a visible and an audible indication that ignition temperature has been reached.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A cigar lighter assembly comprising:
 a heating unit and a socket in which the heating unit is slidably received;
 the heating unit comprising first and second electrical power contacts and having a heating unit housing, the housing having an electrical heating element therein, the electrical heating element having a first end electrically connected to the first electrical power contact, the first electrical power contact comprising an annular contact element disposed at a distal end of said heating unit, the heating unit further comprising a switch, the switch having a first switch contact electrically connected to a second end of said heating element, the switch further having a second switch contact electrically connected to the second electrical power contact, and the heating unit further comprising a bimetal element for opening the switch when the electrical heating element reaches a predetermined temperature;
 the socket comprising a socket housing, the socket housing being sized so as to slidably and frictionally receive the heating unit housing therein, the socket housing having a base at a distal end thereof, the base being provided with a contact cup comprising a plurality of axially projecting fingers each biased radially inwardly for electrically contacting said annular contact element of said heating unit when said heating unit is inserted in said socket, and further comprising an insulating connector assembly at the distal end of said socket housing comprising at least one electrical terminal for connection to a source of electrical power, said electrical terminal being electrically connected to said contact cup.

2. The cigar lighter assembly of claim 1, wherein said contact cup of said socket comprises a plurality of axially directed fingers concentrically arranged about a center axis of said socket housing, each finger extending proximally and then bending back on itself distally, thereby providing a spring bias force directed radially inwardly so as to contact said annular contact element of said heating unit.

3. The cigar lighter assembly of claim 2, wherein the fingers of said contact cup of said socket slidably engage said annular contact element when said heating unit is received in said socket.

4. The cigar lighter assembly of claim 1, wherein said annular contact element of said heating unit comprises a first retainer holding said electrical heating element.

5. The cigar lighter assembly of claim 4, further comprising a second retainer disposed about said first retainer, said second retainer insulating said first retainer from electrical contact with said housing of said heating unit.

6. The cigar lighter assembly of claim 5, wherein said bimetal element comprises a bimetal disc, said second retainer having an annular rim, further comprising a first compression spring retainer, the bimetal disc being disposed proximally with respect to the annular rim, a first compression spring disposed between said first compression spring retainer and said bimetal disc, thereby biasing the bimetal disc against the annular rim of said second retainer.

7. The cigar lighter assembly of claim 6, wherein said first switch contact comprises a first contact member disposed on a center axis of said heating unit and having a proximally disposed contact surface and said second switch contact comprises a movable contact cup, the movable contact cup having a contact surface for engaging said contact surface of said first switch contact to electrically close said switch.

8. The cigar lighter assembly of claim 7, further comprising a second compression spring biasing said contact cup against said bimetal disc, the second spring being disposed between said contact cup and a spring retainer, whereby when said switch heating unit is pushed axially in said socket, said contact cup electrically connects with said first contact member and biases said bimetal disc from a first position to a second position.

9. The cigar lighter assembly of claim 8, wherein when the bimetal disc is disposed in the second position and said contact cup and first contact member are in electrical engagement, said heating element passes an electrical current, is heated up, and said bimetal disc moves to said first position when said heating element reaches said predetermined temperature, moving said contact cup away from said first contact member and removing electrical power from said heating element.

10. The cigar lighter of claim 8, further comprising a visible indicator on said heating unit that said heating element is being provided with electrical current and further wherein the visible indicator comprises an illumination device disposed proximally on said spring retainer, the illumination device projecting visible light to an external knob of said heating unit.

11. The cigar lighter assembly of claim 6, wherein said first switch contact comprises a contact member mechanically fastened to said second retainer, said second retainer being fixed in position in said heating unit housing.

12. The cigar lighter assembly of claim 11, wherein the second retainer is provided with apertures to allow radiant energy from said heating element to radiate to said bimetal disc.

13. The cigar lighter assembly of claim 1, further comprising a visible indicator on said heating unit that said heating element is being provided with electrical current.

14. The cigar lighter of claim 13, wherein the visible indicator comprises an illumination device.

15. The cigar lighter of claim 14, wherein the illumination device projects visible light to an external knob of said heating unit.

16. The cigar lighter of claim 15, wherein the knob is translucent or transparent or has an optical insert.

17. The cigar lighter assembly of claim 15, wherein the illumination device comprises an LED.

18. The cigar lighter assembly of claim 14, further comprising a light guide, lens or reflector for guiding visible energy from said illumination device.

19. The cigar lighter assembly of claim 18, wherein said light guide, lens or reflector directs visible energy from said illumination device to an external knob of said heating unit.

20. The cigar lighter assembly of claim 1, wherein the socket housing and the heating unit housing are electrically conductive and in electrical contact with each other, said socket housing being in electrical contact with a second electrical terminal provided on said insulating connector assembly.

21. The cigar lighter assembly of claim 20, wherein said second electrical power contact comprises said heating unit housing.

22. The cigar lighter assembly of claim 1, further comprising a compression spring disposed in said heating unit housing for allowing an external knob of said heating unit to move axially over a limited distance with respect to said heating unit housing, the compression spring being disposed concentrically between an interior portion of the knob and said heating unit housing.

23. The cigar lighter assembly of claim 1, further comprising an illumination source attached to the socket housing for illuminating the socket housing.

24. The cigar lighter assembly of claim 23, further comprising a glow ring disposed about the socket housing for illumination by the illumination source.

25. The cigar lighter assembly of claim 1, wherein said bimetal element does not pass electrical current for said heating element.

26. The cigar lighter assembly of claim 1, wherein said heating unit switch disconnects said heating element from the source of electrical power sufficiently quickly to prevent overheating of said electrical heating element.

27. The cigar lighter assembly of claim 26, wherein said heating unit switch is operable with a 42 volt electrical supply to disconnect said heating element without damage to said heating element.

28. The cigar lighter assembly of claim 1, wherein said bimetal disc has a plurality of aperture therein.

29. The cigar lighter assembly of claim 1, further comprising a thermal breaker for disconnecting electrical power to said heating element if said heating element exceeds a preset temperature.

30. The cigar lighter assembly of claim 29, wherein the thermal breaker comprises an electrical shorting element for short circuiting electrical power to said heating element, thereby tripping a circuit protector provided in the electrical supply to said heating element.

31. The cigar lighter assembly of claim 30, wherein the electrical shorting element comprises an electrically conductive element that changes position in response to overheating such that said shorting element moves from a first non-shorting position to a second shorting position whereby the shorting element effectively short circuits said first and second electrical power contacts.

32. The cigar lighter assembly of claim 31, wherein the electrical shorting element is disposed concentrically with respect to and in electrical contact with said contact cup of said socket.

33. The cigar lighter assembly of claim 1, further comprising an insulator disposed between said base of said socket housing and said contact cup of said socket, and further comprising a stud passing through an aligned opening in said contact cup, said insulator and said connector assembly and holding said contact cup, said insulator and said connector assembly in fixed relationship.

34. A cigar lighter heating unit to be received in an electrical power socket, the lighter heating unit comprising:
a heating unit housing, first and second electrical power contacts, the housing having an electrical heating element therein, the electrical heating element having a first end electrically connected to the first electrical power contact, the first electrical power contact comprising an annular contact element disposed at a distal end of said heating unit for slidable contact with an electrical power source terminal, the heating unit further comprising a switch, the switch having a first switch contact electrically connected to a second end of said heating element, the switch further having a second switch contact electrically connected to the second electrical power contact, and the heating unit further comprising a bimetal element for opening the switch when the electrical heating element reaches a predetermined temperature.

35. The cigar lighter heating unit of claim 34, further comprising a visible indicator on said heating unit that said heating element is being provided with electrical current.

36. The cigar lighter heating unit of claim 35, wherein the visible indicator comprises an illumination device.

37. The cigar lighter heating unit of claim 36, wherein the knob is translucent or transparent or has an optical insert.

38. The cigar lighter heating unit of claim 34, further comprising a visible indicator on said heating unit that said heating element is being provided with electrical current and wherein the visible indicator comprises an illumination device disposed internally on said housing, the illumination device projecting visible light to an external knob of said heating unit.

39. A socket for an electric cigar lighter heating unit, the socket comprising a socket housing, the socket housing being sized so as to slidably and frictionally receive a housing of the heating unit therein, the socket housing having a base at a distal end thereof, the base being provided with a contact cup comprising a plurality of axially projecting fingers each biased radially inwardly for electrically slidably contacting said annular contact element of said heating unit when said heating unit is inserted in said socket, and further comprising an insulating connector assembly at the distal end of said socket housing comprising at least one electrical terminal for connection to a source of electrical power, said electrical terminal being electrically connected to said contact cup.

40. The socket of claim 39, wherein said contact cup of said socket comprises a plurality of axially directed fingers concentrically arranged about a center axis of said socket housing, each finger extending proximally and then bending back on itself distally, thereby providing a spring bias force directed radially inwardly so as to contact said annular contact element of said heating unit.

41. The socket of claim 40, wherein the fingers of said contact cup of said socket slidably engage said annular contact element when said heating unit is received in said socket.

* * * * *